US011798128B2

(12) United States Patent
Chae et al.

(10) Patent No.: US 11,798,128 B2
(45) Date of Patent: Oct. 24, 2023

(54) ROBUST FRAME SIZE ERROR DETECTION AND RECOVERY MECHANISM TO MINIMIZE FRAME LOSS FOR CAMERA INPUT SUB-SYSTEMS

(71) Applicant: TEXAS INSTRUMENTS INCORPORATED, Dallas, TX (US)

(72) Inventors: Brian Okchon Chae, Johns Creek, GA (US); Niraj Nandan, Plano, TX (US); Anthony Joseph Lell, San Antonio, TX (US); Mihir Mody, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 257 days.

(21) Appl. No.: 16/745,589

(22) Filed: Jan. 17, 2020

(65) Prior Publication Data

US 2021/0209390 A1    Jul. 8, 2021

Related U.S. Application Data (60) Provisional application No. 62/956,975, filed on Jan. 3, 2020, provisional application No. 62/956,379, filed on Jan. 2, 2020.

(51) Int. Cl.
*G06T 3/40* (2006.01)
*G06V 10/32* (2022.01)
(Continued)

(52) U.S. Cl.
CPC ............ *G06T 3/4023* (2013.01); *G06V 10/32* (2022.01); *G06V 10/96* (2022.01); *G06V 10/993* (2022.01);
(Continued)

(58) Field of Classification Search
None
See application file for complete search history.

(56) References Cited

U.S. PATENT DOCUMENTS

| 8,000,552 B2 * | 8/2011 | Chao | G06T 3/4007 |
| | | | 382/261 |
| 2004/0047641 A1 * | 3/2004 | Kato | G03G 15/2039 |
| | | | 399/45 |

(Continued)

OTHER PUBLICATIONS

Kumwilaisak W, Kuo CC. Spatial error concealment with sequence-aligned texture modeling and adaptive directional recovery. Journal of Visual Communication and Image Representation. Feb. 1, 2011;22(2):164-77. (Year: 2011).*

(Continued)

*Primary Examiner* — Emily C Terrell
*Assistant Examiner* — Nathan J Bloom
(74) *Attorney, Agent, or Firm* — Michael T. Gabrik; Frank D. Cimino (57) ABSTRACT

An image data frame is received from an external source. An error concealment operation is performed on the received image data frame in response to determining that a first frame size of the received image data frame is erroneous. The first frame size of the image data frame is determined to be erroneous based on at least one frame synchronization signal associated with the image data frame. An image processing operation is performed on the received image data frame on which the error concealment operation has been performed, thereby enabling an image processing module to perform the image processing operation without entering into a deadlock state and thereby prevent a host processor from having to execute hardware resets of deadlocked modules.

22 Claims, 6 Drawing Sheets

(51) Int. Cl.
　　*G06V 10/96*　　　(2022.01)
　　*G06V 10/98*　　　(2022.01)
　　*H04N 1/00*　　　(2006.01)
(52) U.S. Cl.
　　CPC ..... *H04N 1/00005* (2013.01); *H04N 1/00021* (2013.01); *H04N 1/00034* (2013.01); *H04N 1/00082* (2013.01); *G06T 2207/10016* (2013.01)

(56) References Cited

U.S. PATENT DOCUMENTS

| | | | | |
|---|---|---|---|---|
| 2005/0254509 | A1* | 11/2005 | Smith | H04N 5/04 370/429 |
| 2006/0013318 | A1 | 1/2006 | Fernandes et al. | |
| 2006/0013499 | A1* | 1/2006 | Namie | G06T 3/4007 382/254 |
| 2007/0291836 | A1 | 12/2007 | Shi et al. | |
| 2008/0069470 | A1* | 3/2008 | Yu | A61B 6/5252 382/266 |
| 2008/0310746 | A1* | 12/2008 | Jeon | G06K 9/481 382/242 |
| 2010/0177246 | A1* | 7/2010 | Yong | H04N 5/341 348/580 |
| 2019/0037244 | A1 | 1/2019 | Melkote et al. | |
| 2019/0260958 | A1* | 8/2019 | Wada | H04N 5/74 |
| 2020/0396460 | A1* | 12/2020 | Gao | H04N 19/176 |
| 2021/0201445 | A1* | 7/2021 | Kang | G06T 3/60 |

OTHER PUBLICATIONS

Notification of Transmittal of the International Search Report and the Written Opinion of the International Searching Authority, or the Declaration; PCT/US2020/067124; dated Mar. 18, 2021, 9 pages.

\* cited by examiner

ROBUST FRAME SIZE ERROR DETECTION AND RECOVERY MECHANISM TO MINIMIZE FRAME LOSS FOR CAMERA INPUT SUB-SYSTEMS

CROSS-REFERENCE TO RELATED APPLICATIONS

This application claims priority to U.S. Provisional Application No. 62/956,379, filed Jan. 2, 2020, and U.S. Provisional Application No. 62/956,975, filed Jan. 3, 2020, which are hereby incorporated by reference.

BACKGROUND

Autonomous driving is one of the world's most challenging computational problems. Different functions related to autonomously driving or maneuvering a vehicle can be implemented using advanced driver assistance systems (ADAS) that rely on sensor equipment that provides data of a host vehicle's environment. Such sensor equipment may include RADAR (radio detection and ranging), LIDAR (light detection and ranging), cameras for imaging, and the like. Implemented ADAS functions may range from distance sensing and parking assistance up to sophisticated ADAS functions like cruise control, lane change assist, collision mitigation, emergency braking, fully autonomous driving, and the like. Very large amounts of data from image sensors, RADARs, LIDARs, and HD-Maps must be processed to generate commands to control a vehicle safely and comfortably in real-time in such ADAS systems. This challenging task requires one or more dedicated computing devices that are energy-efficient and low-power, run complex high-performance software, and rely on breakthroughs in artificial intelligence, machine learning, deep learning, and computer vision. Such computing devices may be implemented as energy-efficient and space-efficient System-on-a-Chips (SoCs), which may be integrated into a flexible, expandable platform that enables a wide-range of autonomous vehicles.

Typical computing devices (e.g., SOCs) include multiple internal components that exchange data. For example, a typical processor may include multiple functional blocks such as image signal processors, display engines, and/or media encoders that exchange and process image data. Errors in an incoming continuous stream of image data processed by image signal processor modules on SoCs may not only cause corrupt pixel data that renders image frames unacceptable for use in safety critical applications (e.g., autonomous driving, computer vision) but the faulty frames may also cause other types of issues (e.g., deadlock conditions) in an image processing pipeline which require a hardware reset of one or more modules of the SoC to correct the problem. Using a reset to restart the processing modules has undesirable side effects and often results in loss of additional image frames which runs counter to the high performance, high reliability, and low-latency requirements of safety critical applications. For example, it may be unacceptable to have multiple image data frame losses in an ALIAS system that relies on the image data frames for autonomous driving.

SUMMARY

The following presents a simplified summary of the disclosed subject matter in order to provide a basic understanding of some aspects of this disclosure. This summary is not an exhaustive overview of the technology disclosed herein. It is not intended to identify key or critical elements of the disclosure or to delineate the scope of the disclosure. Its sole purpose is to present some concepts in a simplified form as a prelude to the more detailed description that is discussed later.

In one example, an image processing device includes: an image data receiver that is configured to receive an image data frame from an external source; an error handling module that is communicatively coupled to receive the image data frame from the image data receiver and that is configured to perform an error concealment operation on the received image data frame in response to determining that a first frame size of the image data frame at the error handling module is erroneous, wherein the error handling module determines that the first frame size of the image data frame is erroneous based on at least one frame synchronization signal associated with the image data frame; and an image processing unit that is communicatively coupled to receive from the error handling module, the image data frame on which the error concealment operation has been performed, wherein the image processing unit is configured to perform an image processing operation on the received image data frame.

In another example, an image processing method includes: receiving an image data frame from an external source; performing an error concealment operation on the received image data frame in response to determining that a first frame size of the received image data frame is erroneous, wherein the first frame size of the image data frame is determined to be erroneous based on at least one frame synchronization signal associated with the image data frame; and performing an image processing operation on the received image data frame on which the error concealment operation has been performed.

In another example, the method is embodied in computer executable program code and stored in a non-transitory storage device.

BRIEF DESCRIPTION OF THE DRAWINGS

For a detailed description of various examples, reference will now be made to the accompanying drawings in which.

DETAILED DESCRIPTION

This disclosure pertains to detecting and efficiently handling (e.g., concealing) image frame size and/or synchronization signal protocol errors to minimize frame loss in safety critical applications. Techniques disclosed herein look to avoid deadlock situations in modules or units of an image processing pipeline caused by mishandling of unexpected missing (i.e., undersize) and/or extra (i.e., oversize) pixel data of an image data frame or mishandling caused by an otherwise corrupt image frame (e.g., protocol error). When a continuous stream of image frames is being received from a source (e.g., image sensor) and is being processed in an image processing pipeline real-time, on-the-fly, one or more image processing units of the pipeline may be configured to receive the image frames, each having a specific frame size (reference size) and/or adhering to a predetermined protocol (e.g., synchronization signal protocol).

Various types of errors may be introduced into the bitstream at the source, during transmission, or at the receiver modules of the pipeline, and may cause data corruption of an image frame so that the corrupt image frame no longer adheres to its size and/or protocol configurations as expected by the receiver. That is, uncorrected image sensor data and/or transmission errors in incoming image data bitstream can cause a captured frame to have the wrong frame size due to missing pixel image data and/or faulty frame synchronization information of the input stream and due to data loss following an internal overflow from system traffic overload.

Processing of such a corrupt image frame at the receiver may cause various types of issues in the image processing pipeline, some of which may be more fatal than others. For example, a corrupted image frame that is directly stored into memory and that has erroneously become larger than its expected size (e.g., oversized frame) may cause memory overflow errors from extra writes to the memory caused by the oversized input frame. As another example, a corrupted image frame that is subject to on-the-fly processing by one or more image processing units of the image processing pipeline may unexpectedly cause the receiver image processing unit may enter into an unknown state (e.g., lockup state, deadlock state, and the like) because of the frame size and/or protocol being different from that expected by the receiver.

While corrupt pixel image data only results in corruption of the image data that is stored in memory, frame size or protocol errors during on-the-fly processing can lead to many side effects, including memory corruption or the image processing units (and sub-units) of the image processing pipeline entering into a deadlock state due to the faulty frame. Once the module has entered into the deadlock state, the only option to resolve the deadlock for a host processor implementing the image processing pipeline may be to execute a hardware reset. However, using hardware resets to restart image processing units which are processing incoming image data in real-time applications require the host processor to go through software interrupt processing handling. This interrupt processing handling may, in turn, lead to loss of multiple frames that are being received continuously due to the time required for executing the reset of the stalled components (and sub-components) of the image processing pipeline. Such loss of frames may be unacceptable in safety critical applications like ADAS, infotainment, imaging, computer vision, and the like, that rely on the continuous stream of image data to make real-time decisions.

To prevent image processing units of the pipeline from entering into the deadlock state, and thereby prevent the host processor from having to execute hardware resets, techniques disclosed herein look to efficiently and quickly handle faulty (e.g., illegal or erroneous size) incoming frames so that even if the image data of the frame is corrupted to the point where the pixel image data of the frame may be no longer useable for subsequent processes, an error detection and handling module implemented in the image processing pipeline may detect the frame size error of the faulty incoming frame, and execute appropriate error handling steps to quickly conceal the size error during real-time processing so that the 'size-corrected' frame may pass through the image processing pipeline without causing any deadlock states.

For example, when an undersized input frame is detected, the error handling module may operate to maintain the full input frame size as expected by a downstream image processing unit by generating missing pixels and lines prescribed for the current frame (i.e., full-size frame emulation for downstream processing module). Any remaining incoming data for the faulty undersized frame may be discarded by the handler while filling up the remainder of the frame (pixels and lines) with 'dummy' data. As another example, when an oversized input frame is detected, the error handler may discard remaining incoming data and initialize to wait for start of a next incoming frame. In either erroneous size case, a software interrupt may be issued to the host processor to identify the faulty frame (and provide details of the fault to software layer, e.g., oversized, undersized, protocol error, and the like) that is saved into memory. The host may then implement high-level error handling options (e.g., discard faulty frame and repeat good frame, and the like).

Other embodiments of the error handling module may perform error handling operations on the stream of image frames on a 'line-by-line' basis. That is, the error handling module may perform processing for each erroneously sized (undersized or oversized) input line of the frame by either generating missing pixel data of the current faulty line or discarding the remainder of incoming pixel data of the oversized line, and then handle the next line of pixel data of the frame independently of the previous line. Thus, line-based (line-level) error handling may replicate missing pixel data only within the current line and the next line is handled as a normal line (with any applicable error handling based on detected size error). This scheme may minimize full frame drop merely because of a localized error condition (e.g., error in only one line of an otherwise 'normal' frame). The software interrupt to the host processor in the case of line-based error handling may then include additional error information that is reported to assist the software in making a decision of whether or not to completely reject the erroneous frame based on error location information, region of interest information, and a pixel confidence factor indicating the number of pixels/lines that had to be replicated (e.g., number of dummy pixels/lines) in the erroneous frame.

Figure 1:
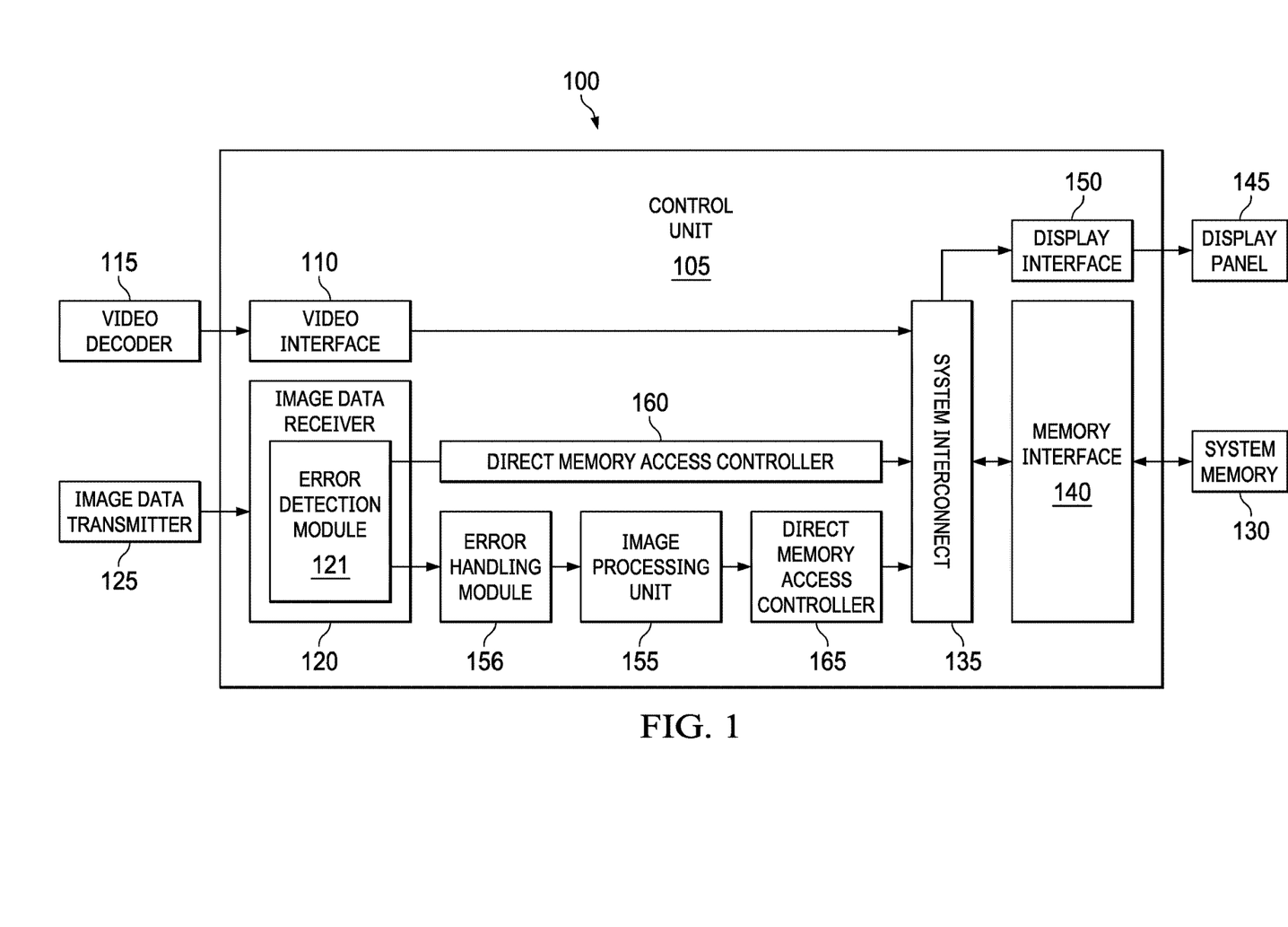
FIG. 1 shows a block diagram of an image processing system according to one or more embodiments.

FIG. 1 shows a block diagram of image processing system 100 according to one or more embodiments. Image processing system 100 may be implemented for a variety of different applications that require real-time processing of an incoming stream of image data (e.g., ADAS, infotainment, imaging, computer vision applications). As shown in FIG. 1, control unit 105 (e.g., image processing device), which may be implemented as a system-on-a-chip (SoC), may be used for receiving a continuous stream of image data from multiple image data sources utilizing different interfaces. In the embodiment shown in FIG. 1, control unit 105 may receive video streams from external sources including a digital parallel video stream received via video interface 110 and connected to an external video decoder 115 or another processor. Control unit 105 may also receive a continuous stream of image data frames via image data receiver 120 that is connected over a serial interface to image data transmitter 125.

In one embodiment, the serial interface connection to transmitter 125 provides high-speed image data transfer via a standardized communication interface. For example, transmitter 125 and receiver 120 may be connected via camera serial interface (CSI) which is a specification of the mobile industry processor interface (MIPI) alliance standard. CSI defines an interface between transmitter (e.g., image sensor, camera, and the like) and control unit 105 (e.g., host processor, SoC, and the like). The image data stream received by receiver 120 may be a continuous sequence of image frames (e.g., received at 30 frames per second) that have a given resolution (e.g., 1 or 2 megapixels).

Image data received via video interface 110 may be at a lower speed relative to the high-speed CSI-MIPI-compliant serial image data transfer via receiver 120. Data input via interface 110 may be saved into system memory 130 via system interconnect 135 and memory interface 140. The video data may also be displayed on display 145 via display interface 150. On the other hand, data received via receiver 120 when control unit 105 is used for certain applications (e.g., automotive) where low processing latency is critical may be transferred to an image processing pipeline implemented using one or more image processing units 155 before the stream of processed image data frames is written out to system memory 130 for further processing or displayed on display panel 145. For example, image processing unit 155 may be an image signal processor (ISP) or hardware accelerator (HWA) module that converts RAW input image data to one of the internal processing color space formats (e.g., YUV or RGB color space formats) and/or performs additional on-the-fly color image processing. Although FIG. 1 illustrates the image processing pipeline being implemented using only one image processing unit 155, this may not necessarily be the case. More than one image processing units 155 may form the image processing pipeline on control unit 105.

When implemented as a CSI-MIPI-compliant interface, the serial image data transfer via receiver 120 may include multiple channels of image data streams transferred over the same physical interface. Receiver 120 of control unit 105 may extract pixel image data (e.g., payload data) out of the received continuous stream of image data and sync signal information (e.g., start/end of frame, start/end of each line of the frame, and the like) from the input bitstream and transfer the received input stream of image data frames to either system memory 130 via direct memory access (DMA) controller 160 or to the connected image processing unit 155 (e.g., HWA module or ISP module) of the image processing pipeline.

While the bitstream is continuously transmitted from transmitter 125 to receiver 120 and subsequently stored into system memory 130 directly or post-processing via the image processing pipeline, various error conditions may be introduced into the input image data at various points along the signal chain. For example, due to various fault conditions, errors may possibly be introduced at the image sensor source (e.g., transmitter 125), on the transport bitstream between transmitter 125 and receiver 120, at receiver 120, and/or at one or more image processing units 155 of the image processing pipeline downstream of receiver 120. Possible sources of error conditions include glitches in an image sensor or image data transmitter 125 causing error in pixel data and/or sync signals at the source, transmission errors from transmitter 125 to control unit 105 not detected/ corrected by receiver 120, and errors introduced by receiver 120 due to wrong user configuration of frame dimension that does not match received frame size, unsupported format detection, and undetected design issues. Other sources of error in the bitstream may include an overflow condition in the receiver 120 resulting in pixel data and/or sync signal information loss and random transient bit corruption due to, e.g., electromagnetic interference in the signal path causing erroneous input frame handling at receiver 120.

When pixel image data has an error (e.g., faulty pixel values), even if the corresponding image frame may be unusable for display or for making autonomous driving decisions, the data can still be passed down to the image processing pipeline for processing without causing fatal deadlock conditions. On the other hand, when the frame data has the wrong line size or frame size or other protocol error, the subsequent image processing pipeline may be unable to handle the corresponding faulty image frame. Failure to detect and/or correct the error conditions, particularly on the line/frame size and sync information, can lead to problems like memory corruption (e.g., overwrites) from a frame with a size error (e.g., oversized frame) being written directly into memory 130. Failure to detect and/or correct the error conditions can also lead to frame corruption due to misaligned sync signals and in certain cases, cause deadlock conditions in the image processing pipeline due to mishandling of unexpected missing and/or extra pixels/lines of a frame.

Error detection and correction mechanisms such as cyclic redundancy check (CRC) and error correction code (ECC) may be implemented on the transport stream between transmitter 125 and receiver 120 to check for payload data and single-bit error correction and 2-bit error detection in the packet header to protect integrity of transmitted data. However, CRC and ECC do not provide protection from frame size and protocol errors which may originate from the upstream image capture module and which may cause fatal deadlock conditions in the image processing pipeline. The frame size and protocol errors may also originate in a module that is downstream of receiver 120. Error detection module 121 and error handling module 156 may detect and appropriately handle such size or protocol errors.

Image data receiver 120 extracts and sends image data frames in real-time to memory 130 and/or to downstream image processing unit 155. Image data receiver 120 may include error detection module 121 which implements a frame size error detection mechanism based on actual frame sizes (e.g., second frame size) against user configured frame reference sizes. In particular, error detection module 121 may perform error detection by checking line width and frame height of input image frame (actual size) against the expected frame size (e.g., reference size) as per the user configuration to detect size deviations. Error detection module 121 may further provide memory protection by discarding extra pixel data of one or more lines when an oversize condition (e.g., extra pixel data in one or more lines or extra lines in one frame) is detected. By discarding the data, error detection module 121 protects memory 130 from extra writes which may otherwise be caused by an oversized input frame.

When error detection module 121 detects an error, the software issues an error interrupt to notify a host processor to handle the resulting error frame. For example, the host processor may mark the frame which may be saved into memory 130 as having a size error. While error detection module 121 performs frame size error detection and memory protection for oversize frames, error detection module 121 may still pass frames with short lines (e.g., missing pixel data in one or more lines; short line) or less than the standard number of lines (e.g., missing one or more lines of the frame; short frame) or frames with other protocol errors to the downstream image processing unit 155 for image processing. Such a frame passed downstream to image processing unit 155 may cause image processing unit 155 to enter into an unknown state leading to a lockup condition. That is, image processing unit 155 configured to receive incoming image data streams may expect exact frame sizes to be input and may lack error handling when an input frame having an unexpected frame size is received. Deviations in the frame size or protocol configurations may lead to output corruptions or even fatal deadlock conditions which require a hardware reset of unit 155 and any downstream modules to resolve the deadlock. For example, the deviations can leave image processing unit 155 of the image processing pipeline in a deadlock state in which unit 155 is waiting for more data to complete the current image data frame processing or in an error state in which unit 155 fails to appropriately handle extra (unexpected) image pixel data of one or more lines of the frame.

To resolve such a deadlock state and restore normal processing of unit 155 for a next image frame of the continuously captured stream of image frames passing through the image pipeline in real-time, the host processor may have to execute a hardware reset to flush affected one or more processing units 155 and restart the pipeline. Further, the deadlock state of processing unit 155 may be detected only when another error (e.g., overflow error) is detected and reported later. This may inevitably result in an error recovery with multiple frame losses which is unacceptable for safety critical automotive applications.

To efficiently handle faulty frames passing through the image processing pipeline, image processing unit 155 may include error handling module 156. Error handling module 156 may be configured to perform frame size error detection and error concealment/handling operations prior to performing image processing operations at image processing unit 155. For example, error handling module 156 may detect frame sync signal protocol violations and frame size errors for each incoming image frame. Error handling module 156 may further perform frame size error concealment operations for detected faulty frames (or lines) and corresponding error reporting and restart operations.

To detect faulty frames having an illegal frame or line size, error handling module 156 may perform size error checks on incoming image data stream of frames by comparing current measured frame size (e.g., first frame size) against reference frame and line sizes (e.g., reference size) provided by the user (i.e., user configuration). For example, error handling module 156 may detect line width errors including detecting a short line in which a given input line of a frame has data of less than the expected number of active pixels and detecting a long line in which a given input line of a frame has data of more than the expected number of active pixels. Error handling module 156 may further detect frame height errors including detecting a short frame in which the current input frame has data of less than the expected number of active lines and detecting a long frame in which the current input frame has data of more than the expected number of active lines. When error handling module 156 detects a frame size error (e.g., long line, short line, long frame, short frame, and the like), error handling module 156 generates an interrupt to indicate the frame size error to the host processor and goes into error handling mode (e.g., error concealment operation).

To detect frame size errors, error handling module 156 may look for frame sync signal protocol violations in incoming frames by utilizing a set of frame synchronization markers (frame synchronization signals) that mark start and end of lines and start and end of frames when image data frames are transferred between receiver 120 and image processing unit 155. Synchronization markers that may be defined and used include:

| Signal name | Default State | Description |
|---|---|---|
| VP.PCLK | 0 | Pixel clock. |
| VP.VS | 0 | Active during the 1st pixel of the frame |
| VP.VE | 0 | Active during the last pixel of the frame |
| VP.HS | 0 | Active during the 1st pixel of any line |
| VP.HE | 0 | Active during the last pixel of any line |
| VP_STALL (optional) | 1 | Video port stalled when 1 |

When the continuous stream of image data frames is being received by image processing unit 155, error handling module 156 may check each incoming frame to ensure that the synchronization markers or signals transition properly for each normal frame input. Error handling module 156 may utilize an illegal line or frame transition detected based on the received frame synchronization markers as an early indicator of a frame size error in the current input frame. In one embodiment, error handling module 156 may perform the following checks using the frame sync signals or markers to detect frame sync signal protocol violations for incoming frames from receiver 120 that are input to image processing unit 155.

| | |
|---|---|
| VE without HE | Frame End (VE) is received without the Line End (HE) |
| VS without HS | Frame Start (VS) is received without the Line Start (HS) |
| VS-VS check | Frame Start (VS) is not paired with a Frame End (VE) |
| HS-HS check | Line Start (HS) is not paired with a Line End (HE) |
| HE-HE check | Line End (HE) is followed by a second Line End (HE) |
| VE-VE check | Frame End (VE) is followed by a second Frame End (VE) |

Figure 2:
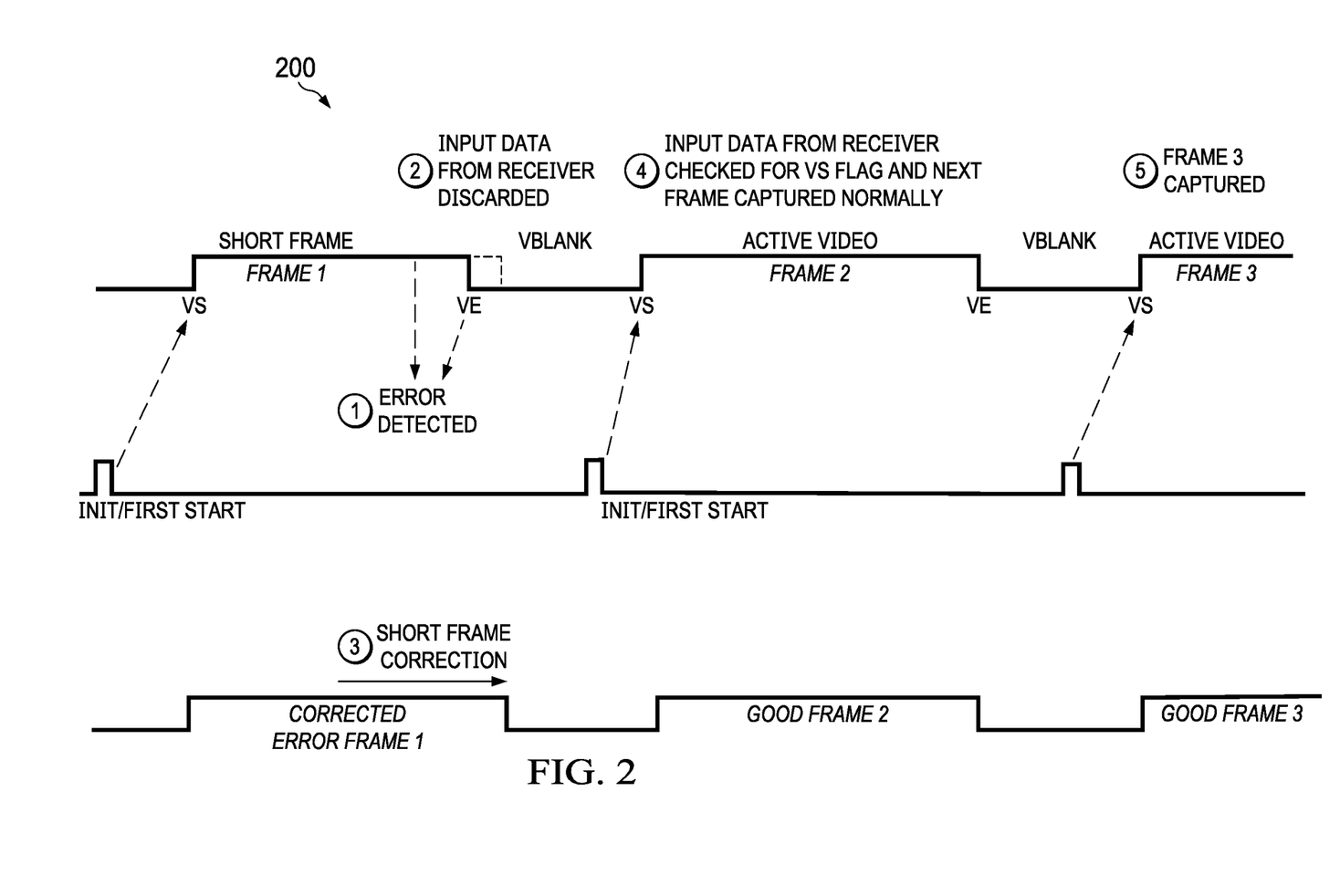
FIG. 2 shows a timing chart illustrating frame-level error detection and handling operation performed by the image processing system according to one or more embodiments.
Figure 3:
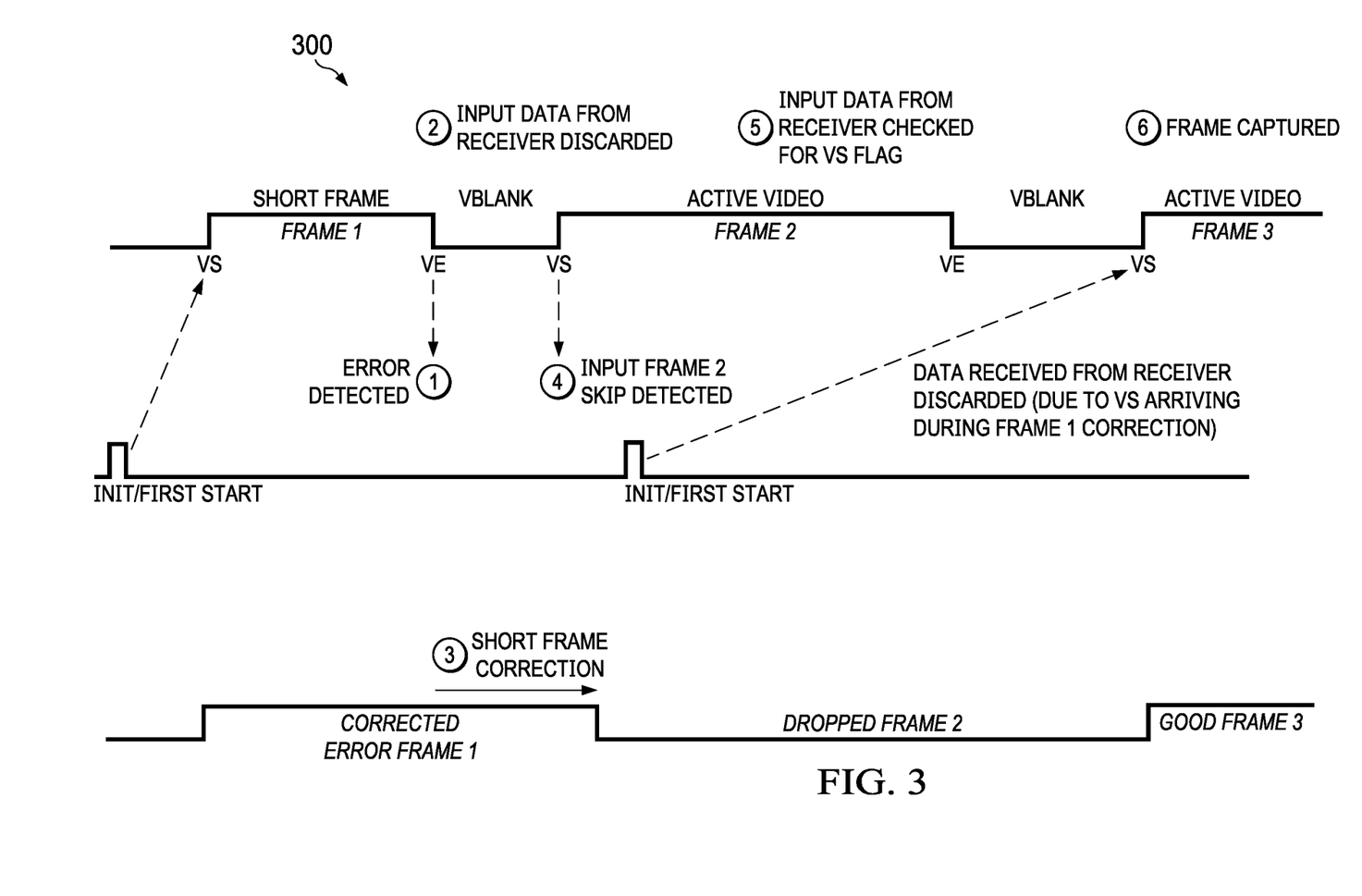
FIG. 3 shows another timing chart illustrating frame-level error detection and handling operation performed by the image processing system according to one or more embodiments.

When one or more of the above frame sync signal protocol violations are detected, error handling module 156 generates an interrupt and reports the detected violations (e.g., protocol violation or error). A protocol error (e.g., missing sync signal, misaligned sync signal, and the like) generally requires the frame to be discarded. To ensure the frame size is maintained at expected levels (reference size) for downstream modules, error handling module 156 may further use the sync signals to detect illegal frame sizes. That is, the sync signals are used for diagnosing frame size errors and reported to the host processor. Upon detecting frame size errors based on frame sync signals, error handling module 156 goes into error handling mode to perform quick error concealment operations to prevent deadlock state of image processing unit 155 or beyond. Image processing unit 155 expects data of an exact number of pixels and lines for each received input image frame to work properly (i.e., normal operation with no errors). Further, DMA controller 165 (and task controller) responsible for handling data transfer between one or more image processing units 155 of the image processing pipeline and system memory 130 may rely on image processing unit 155 to output each processed frame with an exact (expected as per user configuration) frame size. When a frame size error is detected, error handling module 156 immediately switches to error recovery mode to perform undersized or oversized input frame error handling (error concealment operation). FIGS. 2 and 3 illustrate undersized input frame handling performed by error handling module 156 upon detection of an illegal frame size for the current frame.

As shown by way of the timing chart 200 in FIG. 2, when error handling module 156 detects an undersized input frame (e.g., short frame, short line) while processing input Frame 1 (1—error detected) due to earlier than expected receipt of frame synchronization marker VE indicating end of the Frame 1 (e.g., first frame or line size less than reference frame or line size), error handling module 156 goes into error handling mode (error concealment operation) for the current frame, discards any remaining input data for current frame received from receiver 120 (2—input data from receiver discarded; e.g., a remainder of the image data frame discarded) and generates 'dummy' data to complete the current Frame 1 (3—short frame correction). Thus, in the error handling mode, error handling module 156 operates to maintain the full (or expected) input frame size for Frame 1 for processing by image processing unit 155.

Error handling module 156 generates a complete frame for image processing unit 155 by generating data of the missing pixels and lines prescribed for the current frame. Since the frame is deemed an error frame, error handling module 156 may repeat image data of the last known good pixel to complete the frame. In other embodiments, other data from the frame or data other than current frame data may be used to generate the dummy data. Generation of the dummy data is performed at full processing clock speed, which is typically much faster than incoming data which is coming from receiver 120 at pixel clock rate (VP.PCLK). As a result, the error handler can complete the current frame, which is deemed to be an error or faulty frame, as quickly as possible and be ready for the next frame start (Frame 2) at the next corresponding initialization signal (4—input data from receiver checked for VS signal flag and next frame captured normally; and 5—Frame 3 captured).

As shown in the exemplary timing chart 200 of FIG. 2, by performing short frame error correction as per the error handling and concealment operations of error handling module 156, reception of a 'normal' sized frame at image processing unit 155 can be assured (even if the normal sized frame has bad pixel data), and as a result, image processing unit 155 can be prevented from entering into any unknown or deadlock state. In FIG. 2, if not for the undersized input frame error handling of error handling module 156, image processing unit 155 may receive short Frame 1 and enter into a deadlock state which would require the host processor to perform software interrupt processing handling and execute a hardware reset of image processing unit 155 to restart the unit and any sub-units. Such additional steps may cause delay which would lead to loss of additional one or more image frames (e.g., Frame 2, Frame 3, and so on) from the continuous stream of input image frames.

The timing chart shown in FIG. 3 illustrates an alternate scenario of short frame error handling (undersized input frame handling; error concealment operation) by error handling module 156 in one or more embodiments. While the current error frame is being completed by performing the error concealment operation and insertion of dummy data, error handling module 156 may discard the input from receiver 120 to flush any remaining error frame data. As shown in FIG. 3, and as in the case of the timing chart of FIG. 2, when error handling module 156 detects an undersized input frame (e.g., short frame, short line) while processing input Frame 1 (1—Error Detected) due to earlier than expected receipt of frame synchronization marker VE indicating end of the Frame 1, error handling module 156 goes into error handling mode for the current frame, discards any remaining input data for current frame received from receiver 120 (2—input data from receiver discarded) and generates 'dummy' data to complete the current Frame 1 (3—short frame correction).

In such a scenario, if reception of new frame (Frame 2) starts on the continuous image data stream received from receiver 120 while flushing of current Frame 1 is still active, frame synchronization marker VS indicating start of the Frame 2 may arrive before error handling module 156 initializes DMA and gets ready for start of the Frame 2 (4—input frame 2 skip detected). In this case, Frame 2 may get skipped as well and error handling module 156 maintains the error handling mode and discards any remaining input data for current frame 2 received from receiver 120 and issues an interrupt to notify the host controller of the "extra" frame (i.e., Frame 2) loss during the error recovery. In a normal case, when performing error handling and concealment operations for a short frame, this "extra" frame loss will not happen due to a vertical blanking period between incoming frames and due to much slower pixel clock rates (i.e., rates at which new frames come in) as compared to the full processing clock speed at which the error frame is discarded and dummy data generated.

Returning to FIG. 1, when error handling module 156 detects an oversized input frame (e.g., long frame, line line) while processing the current input frame received from receiver 120 (e.g., first frame or line size greater than reference frame or line size; a number of pixels for which data is received by error handling module 156 for at least one of a plurality of lines of the image data frame is greater than a reference number of pixels per line for the image data frame (long line); a number of lines for which data is received by error handling module 156 for the image data frame is greater than a reference number of lines of the image data frame (long frame)), error handling module 156 goes into error handling mode to perform oversized input frame handling (error concealment operation) by discarding all remaining incoming streams of the current oversized image frame and going into error frame quick completion mode by generating the remaining pixel/line data to complete the oversized frame as quickly as possible with dummy data. Since the frame is deemed an error frame, error handling module 156 may repeat image data of the last known good pixel to complete the frame according to its normal expected size. In other embodiments, other data from the frame or data other than current frame data may be used to generate the dummy data and complete the frame.

Generation of the dummy data is performed at full processing clock speed, which is typically much faster than incoming data which is coming from receiver 120 at pixel clock rate (VP.PCLK). As a result of the error handling operation performed for the oversized frame, a complete frame with a normal, expected size can be provided to image processing unit 155. Waiting to finish receiving the oversized frame and then simply discarding data of the extra pixels and lines may take an unknown time period. Also, since error conditions in the remainder of the image data to be received for the current erroneous oversized frame are unknown, waiting to finish receiving the oversized frame may cause the system to enter unknown states.

Once the error handler determines the current frame to be a faulty oversized frame, by completing the current oversized frame as quickly as possible (e.g., by discarding incoming data of current frame and quickly generating dummy data to fill the frame), error handling module 156 enables the shortest possible completion time of the current faulty frame so that error handling module 156 can complete initializing DMA and get ready for start of new frame before arrival of frame synchronization marker VS indicating start of the next frame. The error concealment operation of error handling module 156, that enables image processing unit 155 to complete the current frame with the correct frame size, prevents any deadlock conditions in the control logic in the rest of image processing unit 155 or in other downstream modules of the image processing pipeline and enables seamless error recovery with minimal frame loss and without a hardware (sub-system) reset from a frame size error.

Figure 4:
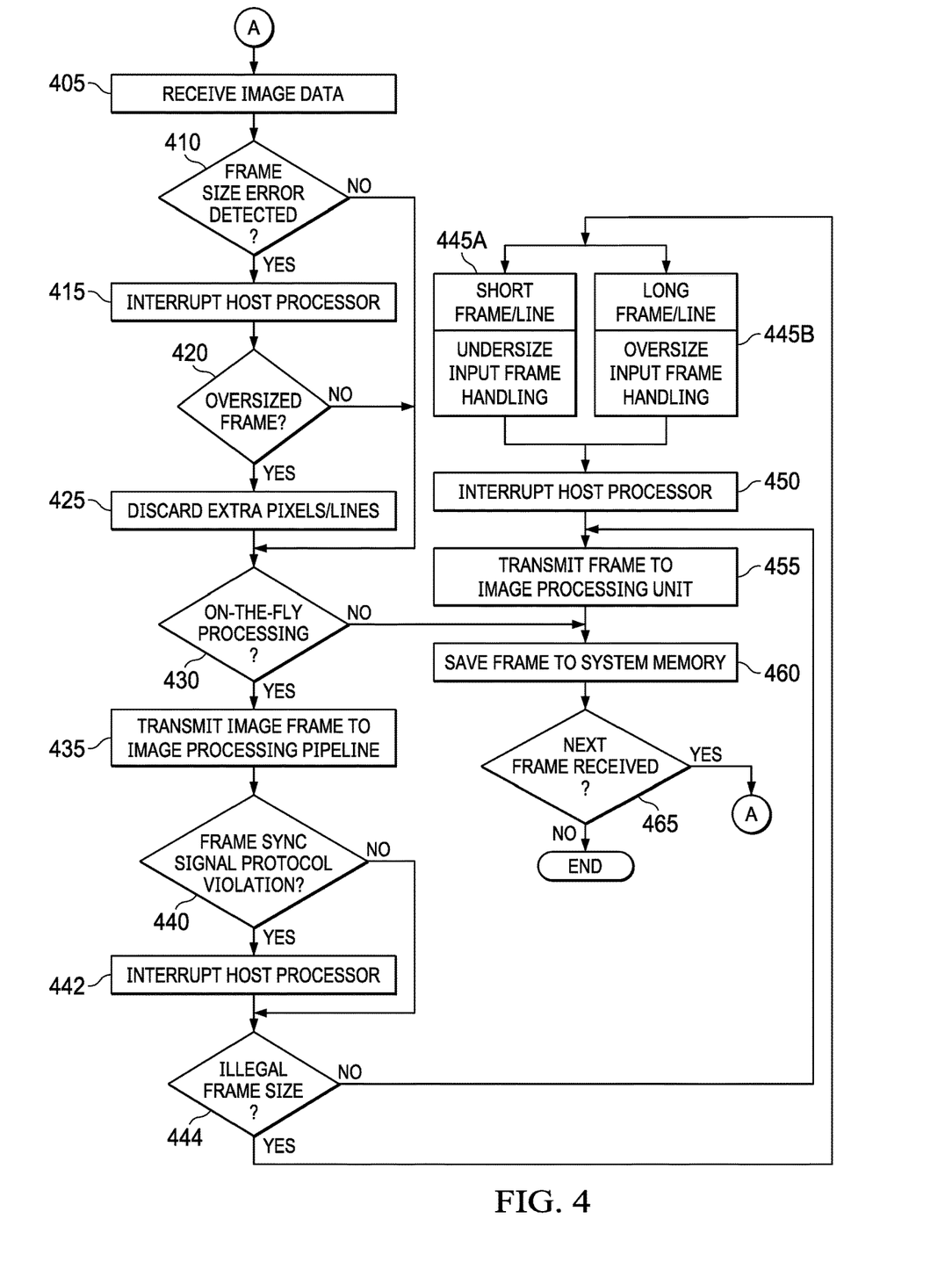
FIG. 4 shows a flowchart of an image processing method for frame-level error detection and handling that may be performed by the image processing system according to one or more embodiments.

FIG. 4 shows a flowchart of image processing method 400 that may be performed by image processing system 100 according to one or more embodiments. As shown in FIG. 4, method 400 begins at block 405 when image data receiver 120 of control unit 105 receives an image data frame. As explained previously, receiver 120 may receive a continuous stream of image data frames from an external source (e.g., image data transmitter 125) consistent with a predetermined communication standard (e.g., CSI-MIPI-standard). At block 410, error detection module 121 of receiver 120 may perform an error detection operation on the received image data frame by checking line width of one or more lines of the input image frame and frame height of the frame (actual received size; second frame size) against the expected line size and frame size as per the user configuration (reference size) to detect size deviations. If a frame size error is detected by error detection module 121 at block 410 (YES at block 410), operation proceeds to block 415 where error detection module 121 may issue an error interrupt (e.g., software interrupt) to notify the host processor that the current received image frame has a frame size error. The host processor may then perform software interrupt processing handling based on the received interrupt to implement high-level error handling options (e.g., discard error frame).

At block 420, error detection module 121 checks to determine if the current frame with the frame size error detected at block 410 is an oversized frame. That is, error detection module 121 determines if data corresponding to current image frame received by receiver 120 includes data for more than the prescribed number of pixels of a line or data of more than the prescribed number of lines of the frame. If error detection module 121 detects the frame to be oversized (YES at block 420), at block 425, error detection module 121 discards the data of the extra pixels and/or lines. For example, error detection module 121 may flush the remainder of the data received for the current image frame once data of the prescribed number of pixels for the prescribed number of lines has been received. Thus, at block 425, error detection module 121 provides memory protection by discarding extra pixel data of one or more lines when an oversize condition is detected. At block 425, if the frame is not an oversized frame (NO at block 420) (e.g., frame is a short or undersized frame in which image data of one or more pixels of one or more lines is missing; i.e., short frame or short lines), error detection module 121 may simply pass the undersized frame to the downstream module (e.g., error handling module 156, image processing unit 155) for further processing.

If no frame size error is detected by error detection module 121 at block 410 (NO at block 410), or if error detection module 121 detects the frame is not oversized (NO at block 420), operation proceeds to block 430 where receiver 120 (or error detection module 121) determines whether the current image frame that has been subject to error detection and memory protection is to be processed on-the-fly, in real-time by the image processing pipeline implemented on control unit 105. That is, at block 430, receiver 120 may route the received image frame directly to DMA controller 160 for storage on system memory 130 (NO at block 430; block 460) if the frame is not to be subject to processing at the image processing pipeline. Alternately, receiver 120 may route the received image frame to error handling module 156 for image processing by image processing unit 155 (YES at block 430) if it is determined at block 430 that the frame is to be processed at the image processing pipeline.

If the frame is to be processed on-the-fly, method 400 proceeds to block 435 where the image frame is transmitted to the image processing pipeline that is implemented on control unit 105. That is, at block 435, receiver 120 (or error detection module 121) transmits the current received image frame to error handling module 156 which in turn transmits the frame after error detection and concealment operations to one or more image processing units 155 constituting the image processing pipeline.

Method 400 then proceeds to block 440 where error handling module 156, that has received the current image frame from receiver 120, detects whether the current received frame violates any of the frame sync signal protocols. At block 440, error handling module 156 utilizes the previously described frame synchronization markers that are active during the beginning and end of each line, and beginning and end of each frame to check whether any of the sync signals received at module 156 are missing or misaligned (e.g., VE without HE, VS without HS, VS-VS check, and the like). If error handling module 156 detects at block 440 any violation of the frame sync signal protocols (YES at block 440), error handling module 156 issues an interrupt to the host processor indicating the protocol error for the current frame (block 442). Protocol errors generally result in the frame being discarded by the host processor during subsequent processing. In order to prevent downstream modules from entering into unknown states and causing deadlock conditions, at block 444, error handling module 156 further checks if the current frame has an illegal frame size. At block 444, error handling module 156 checks the incoming video stream against reference sizes to detect line width errors (e.g., long line, short line) and frame height errors (e.g., long frame, short frame) based on the synchronization markers.

If error handling module 156 detects at block 444 an illegal frame size based on the received sync signals and the user configured reference sizes (YES at block 444), error handling module 156 goes into error handling mode to quickly conceal the size error and maintain the frame sizes as they are expected by downstream modules. This also prevents subsequent frame loss by avoiding deadlock conditions in the image processing pipeline. In the error handling mode, error handling module 156 performs undersized input frame handling (block 445A) or oversized input frame handling (block 445B), based on whether the frame detected with the illegal frame size at block 444 is undersized (e.g., short frame, short line) or oversized (e.g., long frame, long line).

At block 450, error handling module 156 issues an interrupt to the host processor indicating the frame size error for the current faulty frame for which the error handling and concealment operation was performed. After the error concealment operation, the faulty frame (whose frame size is now the expected size) is passed to the downstream module of the image processing pipeline. If, on the other hand, error handling module 156 does not detect any illegal frame size for the current frame (NO at block 444), error handling module 156 transmits the error-free frame downstream to the image processing pipeline (e.g., image processing unit 155) for image processing.

At block 455, the current frame is transmitted to the downstream module of the image processing pipeline (e.g., image processing unit 155) for image processing. Since the frame transmitted at block 455 and received by image processing unit 155 is of the correct size (i.e., size as expected by modules of the pipeline), deadlock conditions in the control logic of the pipeline can be prevented and seamless error recovery is enabled without requiring a hardware reset, thereby minimizing frame loss which is imperative in safety critical applications (e.g., ADAS, computer vision). At block 460, the image frame subject to processing by the image processing pipeline is saved to system memory 130. Method 400 then proceeds to block 465 so that operations of blocks 405-465 are repeatedly performed for each incoming image frame that is received by control unit 105 from external image data sources (e.g., transmitter 125).

The disclosure in FIGS. 1-4 is related to frame-based (or frame-level) error handling and concealment in which once a size error is detected at any point in a given image frame by error handling module 156, the remainder of the erroneous frame is discarded and filled with dummy data and the interrupt is issued to notify the host processor of the erroneous frame. That is, in frame-based (or frame-level) error handling as described above, once an error is detected in a given frame, the frame is marked as a faulty frame and the whole frame may be flushed (e.g., if the size error is in the first line of the frame), even if only a small portion of the frame has the error. In other words, in frame-based error handling, data of all remaining frame pixels following the first error detection is flushed even in the case of a localized error condition. For example, pixel loss due to a momentary FIFO overflow may lead to a single short line in an otherwise good frame. However, under frame-based error handling, the remainder of the frame pixel data may be flushed and replaced with dummy data when the single short line is detected. In case the single short line occurs at the end of the frame (e.g., in the last line of the frame), the frame may still be discarded based on the interrupt to the host processor marking the frame as a faulty frame. However, it may be unnecessary or wasteful to discard the whole frame based on a localized error condition.

Figure 5:
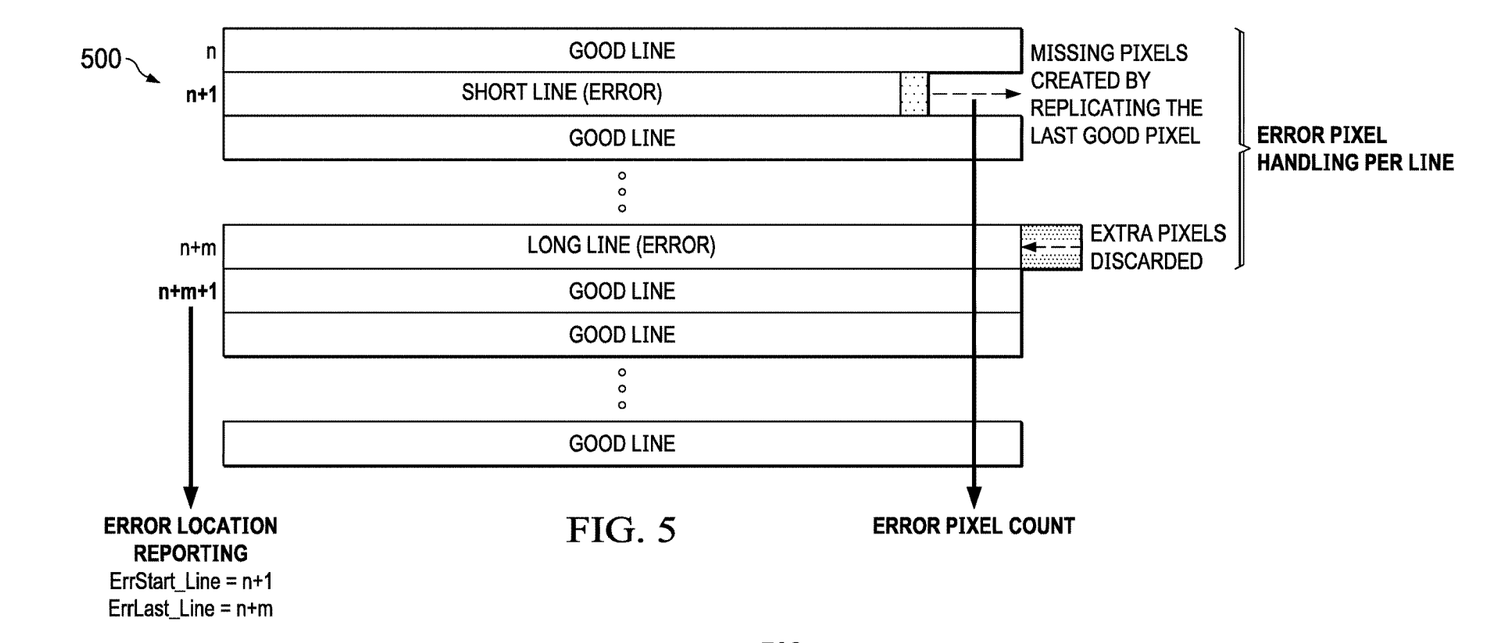
FIG. 5 illustrates line-level error detection and handling operation performed by the image processing system according to one or more embodiments.
Figure 6:
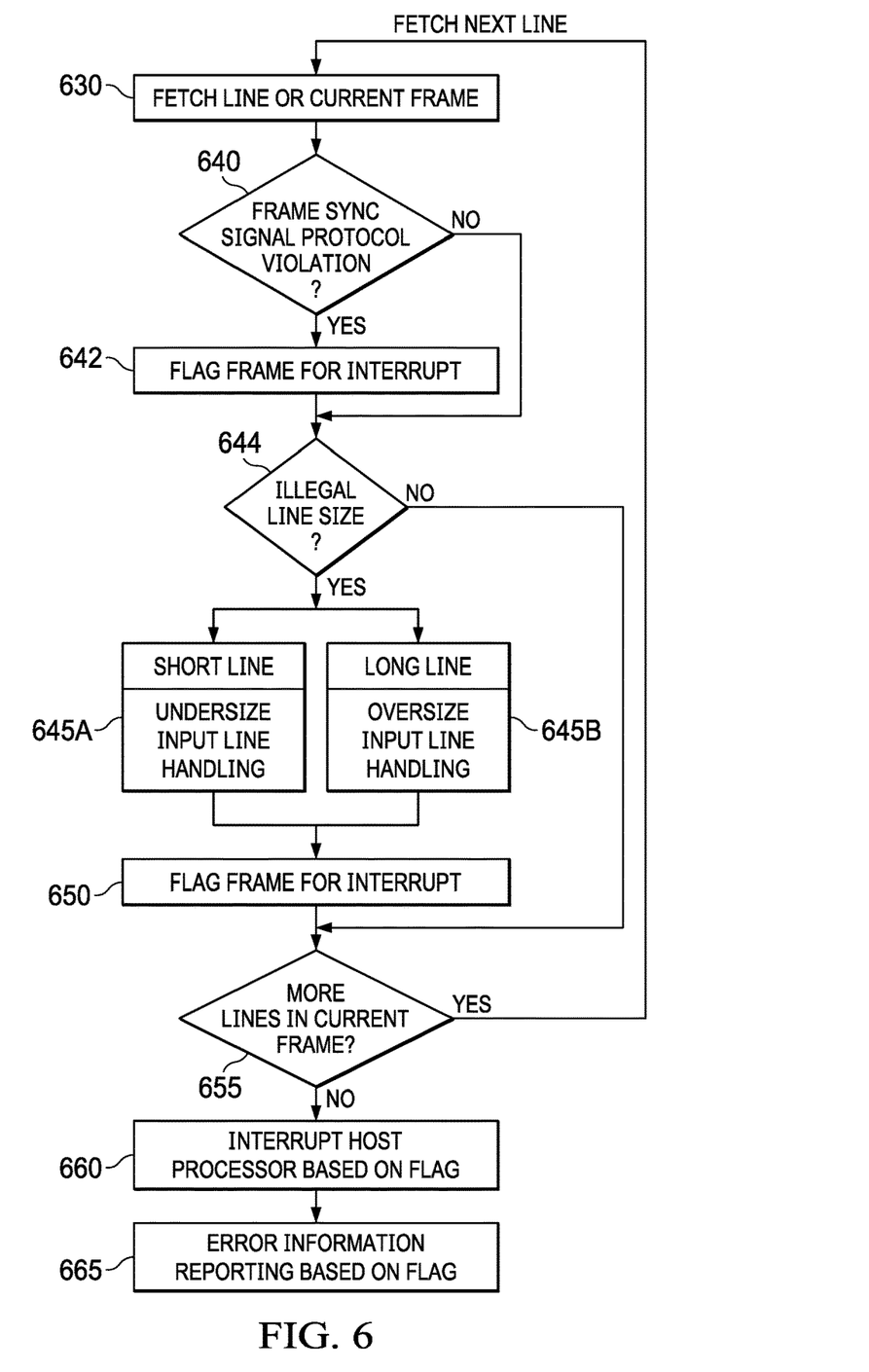
FIG. 6 shows a flowchart of an image processing method for line-level error detection and handling that may be performed by the image processing system according to one or more embodiments.

In the embodiment shown in FIGS. 5 and 6, the error handling and concealment operation performed by the error handling module may be performed on a line-by-line basis (i.e., line-based or line-level error handling) to minimize full frame drops (i.e., discarding the full frame) for localized error conditions. Line-based error handling replicates data for missing pixels only within the current line of the current frame in which the error has been detected (e.g., based on corresponding frame sync signal protocol violation) and the next line of the current frame is handled as a normal line, with the same error handling and concealment operations, if applicable. The line-based error handling module may then perform error information reporting that provides additional information (e.g., error location information, frame confidence value or factor information, and the like) to the host processor along with the software interrupt to aid the processor in making a frame rejection decision (e.g., do not reject the frame if the error is localized and is otherwise outside of a region of interest of the frame). For example, a status register associated with the software interrupt may indicate the additional information regarding the type of error (e.g., undersized frame or line, oversized frame or line, error location information and the lie). Protocol errors (e.g., sync signal misalignment) detected based on sync signal protocol violations are fatal and generally the frame is rendered useless. But in case of localized frame size errors (e.g., frames with illegal frame size), it may be possible to use the frame (i.e., choose not to discard the faulty frame) despite the error, if the software determines (based on the error information read by the software from additional registers associated with the error interrupt) that the region of interest corresponding to the frame with the localized frame size error is error-free (or has erroneous pixel data lower than a predetermined threshold).

The line-based error handling module may keep track of error locations (e.g., which lines of the current frame are faulty) and report the error region or location information to the host when issuing the error interrupt. The host can then use the information to determine whether to use or discard the current frame data. For example, if the pixels or lines with the size error are outside the vertical and/or horizontal region of interest area, then the error can be ignored. The line-based error handling module can also keep track of the number of pixels and/or lines of the current frame that had to be replicated and may report the error count information to the host when issuing the error interrupt. The module may also provide a confidence value (e.g., frame confidence level or number) to the host with the interrupt based on the number of pixels and/or lines of the current frame that had to be replicated. The host can then use this information to better determine whether or not to reject the current faulty image frame completely.

As shown in FIG. 5, the line-level error handling module (not shown) performs error detection and handling/concealment operations on a line-by-line basis. When the error handler detects a short line at line n+1 based on corresponding received line synchronization signals, pixel image data, and reference line size, the line-level error handling module performs line-level error detection and handling (undersized input line error handling; error concealment operation) operations for line n+1 of the current frame. In the example of FIG. 5, when the line-level error handling module detects an undersized input frame (e.g., short line n+1) while processing the current input due to earlier than expected receipt of frame synchronization marker HE indicating end of line n+1, line-level error handling module goes into error handling mode for the current line n+1, and generates 'dummy' data to complete the current line n+1 with corresponding frame synchronization signals. Thus, in the line-level error handling mode, the error handler operates to maintain the full (or expected) input line size for line n+1 for processing by downstream modules. In one embodiment, the line-level error handling module may repeat image data of the last known good pixel of line n+1 to complete the line. In other embodiments, other data from the line n+1 or data other than current line or frame may be used to generate the dummy data. Generation of the dummy data is performed at full processing clock speed, which is typically much faster than incoming data which is coming from the receiver at pixel clock rate (VP.PCLK). As a result, the error handler can complete the current line n+1, which is deemed to be an error or faulty line, as quickly as possible and be ready for the next line n+2.

After completing error processing and handling for short line n+1 in FIG. 1, the line-level error handler may begin processing the next line n+2 of the current frame as a normal line, with the same error handling and concealment operations, if applicable. In the case of frame-based error handling, when error handling module 156 detects the short line at line n+1, all remaining lines starting from line n+1 (including line n+2) may be flushed and filled with dummy data. On the other hand, in the case of line-level error handling, the next line is treated as a normal line, thereby minimizing discarding of 'good' pixel data as in the case of a frame with a localized error (e.g., error in only one or a few lines).

Returning to FIG. 5, when the error handler detects a long line at line n+m based on corresponding received line synchronization signals, pixel image data, and the reference line size, the line-level error handling module performs line-level error detection and handling operations (oversized input line error handling; error concealment operation) for line n+m of the current frame in which it discards all remaining incoming streams of the current oversized image line n+m, and again goes into error frame quick completion mode by generating the remaining pixel data to complete the oversized current line n+m as quickly as possible with dummy data. The error handler may repeat image data of the last known good pixel to complete the line n+m according to its normal expected size. In other embodiments, other data from the line n+m or data other than current line or frame may be used to generate the dummy data and complete the line n+m.

As a result of the error handling operation performed for the oversized line n+m, a complete line with a normal, expected size can be provided to the downstream module. Waiting to finish receiving the oversized line n+m and then discarding data of the extra pixels may take an unknown time period. Also, since error conditions in the remainder of the line n+m image data to be received for the current erroneous line are unknown, waiting to finish receiving the oversized line data may cause the system to enter unknown error states. Once the error handler determines the current line n+m to be a faulty oversized line, by completing the current oversized line as quickly as possible (e.g., by discarding incoming data of current line and quickly generating dummy data to fill the line), the error handler enables the shortest possible completion time of the current line so that it can get ready for start of new line n+m+1 of the current frame and receive the line n+m+1 without error.

Further, as shown in FIG. 5, the line-level error handling module may report the error pixel count (e.g., number of pixels that had to be replicated for the short line n+1, number of pixels that had to be discarded for the long line n+m+1), and the error location or region (e.g., error start line n+1, and error end line n+m+1) within the current frame when issuing the interrupt to the host processor regarding the current faulty frame. The handler may similarly perform processing for subsequent lines of the current frame, with any error detection and handling for each line, as needed.

FIG. 6 shows a flowchart of image processing method 600 that may be performed by an image processing system including the line-based error handling module according to one or more embodiments. Only those steps of line-level error handling method 600 that are different from the frame-level error handling method 400 of FIG. 4 are shown in FIG. 6, and described below in detail. Steps similar to those in frame-level error handling method 400 of FIG. 4 are omitted. In at least some implementations, both the frame level size error checking and the line-based error recovery/concealment described with respect FIGS. 4 and 6 are performed concurrently.

As shown in FIG. 6, at block 630, the line-level error handling module, that has received the current image frame from the receiver of control unit 105, fetches data of pixel lines of the current frame one line at a time. For the line fetched at block 630, the line-level error handling module at block 640 detects whether the current received line of the current frame violates any of the frame sync signal protocols. At block 640, as explained previously, the error handler utilizes frame synchronization markers that are active during beginning and end of each line to check whether the sync signals are missing or misaligned (e.g., HS-HS check, HE-HE check, and the like). If the line-level error handling module detects at block 640 any violation of the frame sync signal protocols (YES at block 640), the module flags the current frame for issuing an interrupt to the host processor indicating the protocol error for the current frame and line (block 642).

In order to ensure downstream modules receive frames and lines with the correct size, at block 644, the line-level error handling module further checks if the current line has an illegal line size. At block 644, the line-level error handling module checks the incoming video stream (actual received line size) against reference sizes to detect line width errors (e.g., long line, short line) based on the synchronization markers.

If the line-level error handling module detects at block 644 an illegal line size based on the received sync signals and the user configured reference sizes (YES at block 644), the error handling module goes into error handling mode to quickly conceal the line size error and maintain the line and frame sizes as they are expected by downstream modules. This also prevents subsequent frame loss by avoiding deadlock conditions in the image processing pipeline. In the line-level error handling mode, the module performs undersized input line handling (block 645A) or oversized input line handling (block 645B), based on whether the line detected with the illegal line size at block 644 is undersized (e.g., short line) or oversized (e.g., long line). At block 650, the error handling module flags the current frame for issuing an interrupt to the host processor indicating the line size error. At block 655, the error handling module determines if there are more lines in the current input image frame, and if yes, begins processing the next line of the current frame.

As shown in FIG. 6, operations corresponding to blocks 630-655 are performed repeatedly and individually for each line of the frame. If, at block 655, the error handler determines that there are no more lines left for error handling and concealment processing in the current frame (NO at block 655), method 600 proceeds to block 660 where the interrupt is issued to the host processor based on the flag that may be set at block 642 and/or at block 650 for one or more lines of the current input frame. Thus, at block 660, the line-level error handling module issues an interrupt to the host processor to indicate the current frame for which (for at least one of the lines of the frame) the line-level error handling and concealment operation was performed is a faulty frame. At block 665, the line-level error handling module may further transmit to the host processor (based on the flag that may be set at block 642 and/or at block 650 for one or more lines of the current input frame) error reporting information like error location and frame confidence value to assist the host processor in determining whether to completely discard the frame or use it for subsequent processing based on region of interest data corresponding to the frame.

The image processing system with frame-level or line-level error detection and recovery operations as disclosed herein provides a hardware-based solution to prevent deadlock conditions by maintaining full frame size and concealing frame errors. The solution provides frame- and line-level handling of frame errors and graceful error recovery in hardware (or software or both) to minimize the number of lost frames as compared to the case where a software issued reset is performed in response to an interrupt for error recovery. Further, in the line-level error detection and handling operation, error information (e.g., error location information) is provided to the host to minimize unnecessary frame rejections. By implementing error detection (and concealment) operation at multiple layers (e.g., on the receiver, on the downstream image processing unit of the image processing pipeline), protection along the full image data signal path can be ensured.

Figure 7:
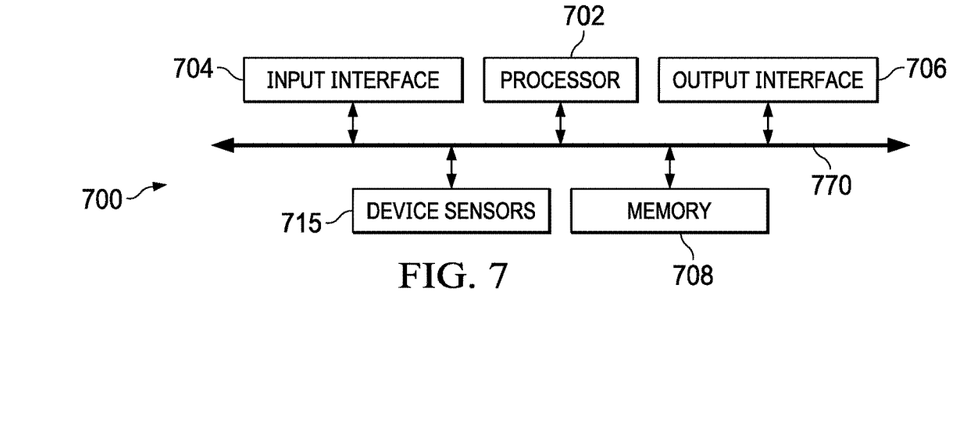
FIG. 7 shows an illustrative simplified block diagram of a computing system according to one or more embodiments.

FIG. 7 shows an illustrative simplified block diagram of computing system 700 in accordance with one or more embodiments. Computing system 700 may correspond to or may be part of a computer and/or any other computing device, such as a workstation, server, mainframe, super computer, and/or portable computing device. With reference to FIG. 1, computing system 700 may correspond to control unit 105. The computing system 700 comprises a processor 702 which may include one or more processors (CPUs, GPUs, or other types of integrated circuits) and/or other type of system on chip (SoC) components to process image data. As an example, processor 702 may include processing components, such as application specific integrated circuits (ASICs), field-programmable gate arrays (FPGAs), digital signal processors (DSPs), and memory for performing various image processing operations associated with the image or pixel processing pipeline as described herein. The processor 702 may communicate (e.g., via a system bus 770) and/or provide instructions to other components within the computing system 700, such as the input interface 704, output interface 706, and/or memory 708. In one embodiment, processor 702 may comprise one or more multi-core processors and/or memory mediums (e.g., cache memory) that function as buffers and/or storage for data. Although FIG. 7 illustrates that processor 702 may be a single processor, processor 702 is not so limited and instead may represent multiple processors.

FIG. 7 illustrates that memory 708 may be operatively coupled to processor 702. Memory 708 may be a non-transitory medium configured to store various types of data. For example, memory 708 may include one or more memory devices that comprise secondary storage, read-only memory (ROM), and/or random-access memory (RAM). The secondary storage is typically comprised of one or more disk drives, optical drives, solid-state drives (SSDs), and/or tape drives and is used for non-volatile storage of data. In certain instances, the secondary storage may be used to store overflow data if the allocated RAM is not large enough to hold all working data. The secondary storage may also be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions.

Memory 708 may be used to house the instructions and logic for carrying out various embodiments described herein. In an embodiment, memory 708 may comprise error detection and error handling/concealment logic that may be accessed and implemented by processor 702. Additionally, or alternatively, this logic may be stored and accessed within memory embedded in processor 702 (e.g., cache memory) or implemented in hardware or in some combination of hardware and software. In one embodiment, memory 708 may interface with system bus 770 (e.g., a computer bus) to communicate and/or transmit information stored in memory 708 to processor 702 during execution of software programs, such as software applications that comprise program code, and/or computer executable process steps that incorporate functionality described herein.

Persons of ordinary skill in the art are aware that software programs may be developed, encoded, and compiled in a variety of computing languages for a variety of software platforms and/or operating systems and subsequently loaded and executed by processor 702. In one embodiment, the compiling process of the software program, may transform program code written in a programming language to another computer language such that the processor 702 is able to execute the programming code. For example, the compiling process of the software program may generate an executable program that provides encoded instructions (e.g., machine code instructions) for processor 702 to accomplish specific, non-generic, particular computing functions, such as performing the error detection and handling/concealment operations described herein.

After the compiling process, the error detection and handling/concealment operations described herein may be loaded as computer executable instructions or process steps to processor 702 from storage (e.g., memory 708, storage medium/media, removable media drive, and/or other storage device) and/or embedded within the processor 702. Processor 702 can execute the stored instructions or process steps to perform instructions or process steps to transform computing system 700 into a non-generic, particular, specially programmed machine or apparatus. Stored data, e.g., data stored by a storage device, can be accessed by processor 702 during the execution of computer executable instructions or process steps to instruct one or more components within computing system 700.

Alternatively, rather than programming and/or loading executable instructions onto memory 708 and/or processor 702 to form a non-generic, particular machine or apparatus, persons of ordinary skill in the art are aware that stored instructions may be converted and implemented as hardware customized for a particular use (e.g., SOC for ADAS, infotainment, imaging, and computer vision applications). In one embodiment, implementing operations, such as the error detection and handling/concealment operations described herein, by loading executable software into a computing device, can be converted to a hardware implementation by well-known design rules. For example, the compiling process of the software program may build a sequence of instruction bits that control and arrange a sequence of control gate-level components that write data onto buses, into latches and registers, across channels, memory, and/or other components of processor 702 and/or memory 708. The compiling of the image processing operations may produce gate-level components with fixed relationships designed to accomplish specific, non-generic, particular computing functions.

The decisions between implementing a concept in software versus hardware may depend on a number of design choices that include stability of the design and numbers of units to be produced and issues involved in translating from the software domain to the hardware domain. Often a design may be developed and tested in a software form and subsequently transformed, by well-known design rules, to an equivalent hardware implementation in an ASIC or other application specific hardware that hardwires the instructions or process steps of the software. In the same manner as a machine controlled by a new ASIC is a non-generic, particular, specially programmed machine or apparatus, likewise a computing device (e.g., a computer) that has been programmed and/or loaded with executable instructions or process steps should be viewed as a non-generic, particular, specially programmed machine or apparatus.

FIG. 7 also illustrates that processor 702 may be operatively coupled to input interface 704 configured to receive input sensor data and/or direct-report data, and output interface 706 configured to output and/or display, e.g., image data. The input interface 704 may be configured to obtain input sensor data and/or direct-report data and/or other information via cables, connectors, wireless connections and/or other communication protocols. In one embodiment, input interface 704 may be a network interface that comprises multiple ports configured to receive and/or transmit data via a network. In particular, the network interface may transmit the data via wired links, wireless link, and/or logical links. Other examples of input interface 704 may be universal serial bus (USB) interfaces, CD-ROMs, DVD-ROMs and/or connections to one or more sensors. Output interface 706 may include to one or more connections for a graphic display (e.g., monitors), a printing device that produces hard-copies of the generated results, and/or a plurality of ports that transmit data via cables, connectors, wireless connections, and/or other communication protocols.

FIG. 7 also illustrates that processor 702 may be operatively coupled to one or more device sensors 715. Device sensors 715 may include, but need not be limited to, an an optical sensor array, a sound sensor, image sensor, CMOS sensor, an ambient light sensor, a heat sensor, a light sensor, a differential light sensor, a pixel array, a micro pixel array, and the like. Persons of ordinary skill in the art are aware that computing system 700 may comprise other components well known in the art, such as other sensors, powers sources, and/or analog-to-digital converters, not explicitly shown in FIG. 7.

It is to be understood that the above description is intended to be illustrative, and not restrictive. The material has been presented to enable any person skilled in the art to make and use the claimed subject matter as described herein, and is provided in the context of particular embodiments, variations of which will be readily apparent to those skilled in the art (e.g., some of the disclosed embodiments may be used in combination with each other). In addition, some of the described operations (image processing methods 400 and 600) may have their individual steps performed in an order different from, or in conjunction with other steps than presented herein. Also, some of the disclosed steps may be omitted. More generally, if there is hardware support some operations described in conjunction with FIGS. 1-6 may be performed in parallel.

Reference in this disclosure to "one embodiment" or to "an embodiment" means that a particular feature, structure, or characteristic described in connection with the embodiment is included in at least one embodiment of the disclosure, and multiple references to "one embodiment" or "an embodiment" should not be understood as necessarily all referring to the same embodiment. The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

At least one embodiment is disclosed and variations, combinations, and/or modifications of the implementation(s) and/or features of the implementation(s) made by a person having ordinary skill in the art are within the scope of the disclosure. Alternative implementations that result from combining, integrating, and/or omitting features of the implementation(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Many other implementations will be apparent to those of skill in the art upon reviewing the above description. The scope of the disclosure therefore should be determined with reference to the appended claims, along with the full scope of equivalents to which such claims are entitled. In the appended claims, the terms "including" and "in which" are used as the plain-English equivalents of the respective terms "comprising" and "wherein."

"The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A."

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors. The recitation "approximately" before the recitation of a value is intended to cover all values within the range of ±10% of the value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. An image processing device, comprising:
   an error handling circuit configured to:
   receive an image dataframe;
   determine that a size of the image data frame is erroneous based on a first marker indicating a start of the image data frame and further based on a second marker indicating an end of the image data frame; and
   perform an error concealment operation on the image data frame in response to determining that the size of the image data frame is erroneous, the error concealment operation including discarding data of a remainder of the image data frame being received by the error handling circuit, and
   when the image data frame is determined to be undersized, determine that pixel data of at least one of a plurality of lines of the image data frame is missing, and in response, generate dummy data for the missing pixel data, and
   when the image data frame is determined to be oversized, generate dummy data to complete the image data frame; and
   an image processing circuit that is communicatively coupled to receive, from the error handling circuit, and perform an image processing operation on, the image data frame on which the error concealment operation has been performed.

2. The image processing device according to claim 1, wherein, in performing the error concealment operation when the image data frame is determined to be undersized and pixel data of at least one of a plurality of lines of the image data frame is determined to be missing, the error handling circuit is further configured to:
   generate the dummy data for the missing pixel data so that the size of the image data frame becomes equal to a reference size.

3. The image processing device according to claim 2, wherein the error handling circuit generates the dummy data by repeating data of a last received good pixel of the image data frame.

4. The image processing device according to claim 1, wherein to determine that the image data frame is oversized, the error handling circuit is further configured to determine that the size of the image frame is larger than a reference size, and in response to determining that the size of the image frame is larger than the reference size, the error handling circuit is further configured to:
   generate the dummy data to complete the image data frame so that the size of the completed image data frame becomes equal to the reference size.

5. The image processing device according to claim 4, wherein to determine that the size of the image data frame is larger than the reference size, the error handling circuit is configured to determine that a number of pixels for which data is received by the error handling circuit for at least one of a plurality of lines of the image data frame is greater than a reference number of pixels per line for the image data frame.

6. The image processing device according to claim 4, wherein to determine that the size of the image data frame is larger than the reference size, the error handling circuit is configured to determine that a number of lines for which data is received by the error handling circuit for the image data frame is greater than a reference number of lines of the image data frame.

7. The image processing device according to claim 1, wherein the error handling circuit is further configured to detect a frame sync signal protocol violation for the image data frame based on at least one of the first marker, the second marker, or a third marker,
   wherein the first marker comprises a vertical-start signal that is active while receiving data of a first pixel of the image data frame by the error handling circuit,
   wherein the second marker comprises a vertical-end signal that is active while receiving data of a last pixel of the image data frame by the error handling circuit, and
   wherein the third marker comprises:
   a horizontal-start signal that is active while receiving data of a first pixel of each of a plurality of lines of the image data frame by the error handling circuit; or
   a horizontal-end signal that is active while receiving data of a last pixel of each of the plurality of lines of the image data frame by the error handling circuit.

8. The image processing device according to claim 7, wherein the error handling circuit is further configured to interrupt a host processor in response to detecting the frame sync signal protocol violation for the image data frame.

9. The image processing device according to claim 1, further comprising an image data receiver circuit communicatively coupled to the error handling circuit, wherein the image data receiver circuit is configured to receive a continuous stream of image data frames, and wherein the error handling circuit is configured to perform the error concealment operation for each image data frame of the continuous stream in response to determining that a size of the corresponding image data frame is erroneous.

10. The image processing device according to claim 1, further comprising an error detection circuit that is communicatively coupled to the error handling circuit,
    wherein the size of the image data frame is a first size, and
    wherein the error detection circuit is configured to determine whether a second fame-size of the image data frame is erroneous based on a reference size.

11. The image processing device according to claim 10, wherein the error detection circuit is further configured to:
    determine whether the second size of the image data frame is larger than the reference size; and
    responsive to determining that the second size is larger than the reference size, discard extra pixel data of one or more lines of the image data frame so that the second size becomes equal to the reference size.

12. The image processing device according to claim 1, wherein the error handling circuit is further configured to interrupt a host processor in response to determining that the size of the image data frame is erroneous.

13. The image processing device according to claim 12, wherein the error handling circuit is further configured to perform the error concealment operation for each of a plurality of lines of the image data frame, one line at a time.

14. The image processing device according to claim 13, wherein the error handling circuit is further configured to report error information to the host processor, wherein the error information includes at least one of error location information and frame confidence value information.

15. An image processing method, comprising:
    receiving an image data frame;
    determining that a size of the image data frame is erroneous based on a first marker indicating a start of the image data frame and further based on a second marker indicating an end of the image data frame;

performing an error concealment operation on the image data frame in response to determining that the size of the image data frame is erroneous, wherein the error concealment operation includes:
    discarding data of a remainder of the image data frame being received by the error handling circuit, and
    when the image frame is determined to be undersized and pixel data of at least one of a plurality of lines of the image data frame is determined to be missing, generating dummy data for the missing pixel data, and
    when the image data frame is determined to be oversized, generating dummy data to complete the image data frame; and performing an image processing operation on the image data frame on which the error concealment operation has been performed.

16. The image processing method according to claim 15, wherein generating the dummy data for the missing pixel data includes:
    generating the dummy data for the missing pixel data so that the size of the image data frame becomes equal to a reference size.

17. The image processing method according to claim 15, wherein generating the dummy data to complete the image data frame includes:
    generating the dummy data to complete the image data frame so that the size of the completed frame becomes equal to the reference size.

18. The image processing method according to claim 15, further comprising:
    detecting a frame sync signal protocol violation for the image data frame based on at least one of the first marker, the second marker, or a third marker,
    wherein the first marker comprises a vertical-start signal that is active while receiving data of a first pixel of the image data frame,
    wherein the second marker comprises a vertical-end signal that is active while receiving data of a last pixel of the image data frame,
    wherein the third marker comprises:
        a horizontal-start signal that is active while receiving data of a first pixel of each of a plurality of lines of the image data frame; or
        a horizontal-end signal that is active while receiving data of a last pixel of each of the plurality of lines of the image data frame.

19. The image processing method according to claim 1, wherein the size of the image data frame is a first size, the method further comprising determining whether a second size of the image data frame is erroneous based on a reference size,
    wherein the second size of the image data frame is measured by a first module of an image processing device that is upstream of a second module of the image processing device that performs the error concealment operation.

20. The image processing method according to claim 19, further comprising:
    determining whether the second size of the image data frame is larger than the reference sine;
    responsive to determining that the second size is larger than the reference size, discarding, by the first module, extra pixel data of one or more lines of the image data frame so that the second size becomes equal to the reference size; and
    transmitting the image data frame with the discarded extra pixel data to the second module.

21. The image processing method according to claim 15, further comprising interrupting a host processor in response to determining that the size of the image data frame is erroneous.

22. A non-transitory computer readable medium comprising instructions stored thereon that, when executed by one or more processors, cause the one or more processors to:
    receive an image data frame;
    determine that a size of the image data frame is erroneous based on a first marker indicating a start of the image data frame and further based on a second marker indicating an end of the image data frame;
    perform an error concealment operation on the image data frame in response to determining that the size of the image data frame is erroneous, wherein, in performing the error concealment operation, the one or more processors:
        discard data of a remainder of the image data frame being received by the error handling circuit, and
        when the image frame is determined to be undersized and pixel data of at least one of a plurality of lines of the image data frame is determined to be missing, generate dummy data for the missing pixel data, and
        when the image data frame is determined to be oversized, generate dummy data to complete the image data frame, and
    perform an image processing operation on the image data frame on which the error concealment operation has been performed.

* * * * *